United States Patent
Pendar et al.

(10) Patent No.: US 12,248,467 B1
(45) Date of Patent: Mar. 11, 2025

(54) ARTIFICIAL INTELLIGENCE-POWERED SEARCH AND EVALUATION SYSTEM

(71) Applicant: SAP SE, Walldorf (DE)

(72) Inventors: Nick Pendar, San Ramon, CA (US); Arjun Rao, Fremont, CA (US); Terison Gregory, Dublin, CA (US)

(73) Assignee: SAP SE, Walldorf (DE)

( * ) Notice: Subject to any disclaimer, the term of this patent is extended or adjusted under 35 U.S.C. 154(b) by 2 days.

(21) Appl. No.: 18/516,642

(22) Filed: Nov. 21, 2023

(51) Int. Cl.
*G06F 16/24* (2019.01)
*G06F 16/2452* (2019.01)
*G06F 16/9532* (2019.01)

(52) U.S. Cl.
CPC .... *G06F 16/24522* (2019.01); *G06F 16/9532* (2019.01)

(58) Field of Classification Search
CPC .................................................. G06F 16/9532
See application file for complete search history.

(56) References Cited

U.S. PATENT DOCUMENTS

| | | | |
|---|---|---|---|
| 10,607,281 B2 | 3/2020 | Kneen et al. | |
| 11,704,724 B2 | 7/2023 | Kneen et al. | |
| 12,008,621 B1 * | 6/2024 | Atef | G06Q 30/0625 |
| 12,182,215 B2 * | 12/2024 | Cho | G06Q 30/0201 |
| 2023/0316390 A1 | 10/2023 | Kneen et al. | |

FOREIGN PATENT DOCUMENTS

WO  WO 2015/100247  7/2015

OTHER PUBLICATIONS

Reback et al., "Elasticsearch Queries: A Guide to Query DSL," https://logz.io/blog/elasticsearch-queries/, 12 pages (accessed Oct. 21, 2023).
Elastic, "Query DSL," https://www.elastic.co/guide/en/elasticsearch/reference/current/query-dsl.html, 3 pages (accessed Oct. 21, 2023).
Aravind Putrevu, "Everything you need to know about index in Elasticsearch!," https://aravind.dev/everything-index-elastic/, 15 pages, Mar. 16, 2021.
Wikipedia, "Search engine results page," https://en.wikipedia.org/wiki/Search_engine_results_page, 5 pages (accessed Oct. 27, 2023).

* cited by examiner

*Primary Examiner* — Loc Tran
(74) *Attorney, Agent, or Firm* — Klarquist Sparkman, LLP

(57) ABSTRACT

A computing system configured to perform artificial intelligence-powered search and evaluation functionalities is disclosed. The computer system can receive a natural language search input entered through a user interface, request a search engine to perform a search based on the natural language search input, receive search results returned by the search engine, and submit, in runtime, structured data contained in the search results to a large language model. The structured data includes a table including one or more records and a plurality of fields. The computing system can prompt, in runtime, the large language model to generate scores for the one or more records and present the structured data and the scores on the user interface.

20 Claims, 12 Drawing Sheets

```
[{'position': 1,
'title': 'Antique 18th Century Bronze Chinese Flower Vase 1700s',
'link': 'https://www.etsy.com/listing/785032864/antique-18th-century-bronze-chinese?gpla=1&gao=1&',
'product_link': 'https://www.google.com/shopping/product/12gl=us&prds=pid:5692838273228491283',
'product_id': '5692838273228491283',
'serpapi_product_api': 'https://serpapi.com/
search.json?device=desktop&engine=google_product&gl=us&google_domain=google.com&hl=en&product_id=5692838273228491283',
'source': 'Etsy - CuriousVintageThings',
'price': '$184.95',
'extracted_price': 184.95,
'second_hand_condition': 'used',
'thumbnail': 'https://encrypted-tbn2.gstatic.com/
shopping?q=tbn:ANd9GcQbno8tZZkgZ09if804qs3Y7530dRZ5vrQiQ3flpzhYDAFfdoD_snTU4IQZIuXFhIipT_2ztemEumPoi9vzD_JsMA6
IZgUYnIyaQMPxA&usqp=CAE',
'delivery': '$20.33 delivery'},
{'position': 2,
'title': 'Largetail Antique Vintage Victorian French England Colonial Scene Vase',
'link': 'https://www.ebay.com/itm/274319662350?chm=ps&mkevt=1&mkcid=28&srsltid=AfmBOopIj3qorCj6M-Nfo1CY61HvSxOC6T-
83Iu8JEmhPxX9XvBOz8EK2SQ',
'product_link': 'https://www.google.com/shopping/product/12gl=us&prds=pid:17114077481924531943',
'product_id': '17114077481924531943',
'serpapi_product_api': 'https://serpapi.com/
search.json?device=desktop&engine=google_product&gl=us&google_domain=google.com&hl=en&product_id=17114077481924531943',
'source': 'eBay - acruzarieta',
'price': '$150.00',
'extracted_price': 150.0,
'second_hand_condition': 'used',
'thumbnail': 'https://encrypted-tbn1.gstatic.com/
shopping?q=tbn:ANd9GcQFCXly8jt3Nte0V3Owq9j6j7GGhbsElKqijUlm9JrvULVpQKUpefqz03b4ZceXRVyqJifuhKevsgcHFwp6ifdot8MrS
6Zm2mCLKeD1l-oe&usqp=CAE',
'delivery': 'Delivery by Fri, Oct 20'},
{'position': 3,
'title': 'Antique porcelain vase with gold accents, romantic renaissance scene of victorian...',
'link': 'https://www.etsy.com/listing/1377052246/antique-porcelain-vase-with-gold-accents?gpla=1&gao=1&',
...}]
```

Query: car restoration, wheel cap hub GT shelby ← 1010

| No. | Index | Type | ID | Score | Query Matched | Content |
|---|---|---|---|---|---|---|
| 1 | my_index | image | 1 | 0.98 | car restoration | wheel cap hub GT shelby |
| 2 | my_index | image | 2 | 0.85 | car modification | wheel cap hub GT shelby |
| 3 | my_index | image | 3 | 0.75 | car tuning | wheel cap hub GT shelby |

← 1020

| Ranking | No. | Index | Type | ID | Score | Query Matched | Content |
|---|---|---|---|---|---|---|---|
| 1 | 1 | my_index | image | 1 | 0.98 | car restoration | wheel cap hub GT shelby |
| 2 | 2 | my_index | image | 2 | 0.85 | car modification | wheel cap hub GT shelby |
| 3 | 3 | my_index | image | 3 | 0.75 | car tuning | wheel cap hub GT shelby |

ARTIFICIAL INTELLIGENCE-POWERED SEARCH AND EVALUATION SYSTEM

BACKGROUND

In an enterprise context, identifying industry trends or characteristics of items is often required. This could be for competitive analysis or assessing an item's potential value. A common approach involves web crawling and predictive modeling. However, web crawling has both technical and legal challenges. For example, web crawling can lead to legal disputes if websites demand cessation of the activity. Additionally, web crawling is a resource-intensive process, requiring significant manual effort and time. Each new product domain necessitates the setup of new crawlers and training of a fresh predictive model, adding to the complexity. Thus, room for improvement exists for efficient retrieval of business intelligence information.

BRIEF DESCRIPTION OF THE DRAWINGS

FIG. 6 depicts example search results after a web-based search.

FIG. 10 depicts another example natural language query input by a user, structured data returned by searching an index using the Elasticsearch query of FIG. 9, and an output presented to the user.

DETAILED DESCRIPTION

Figure 1:
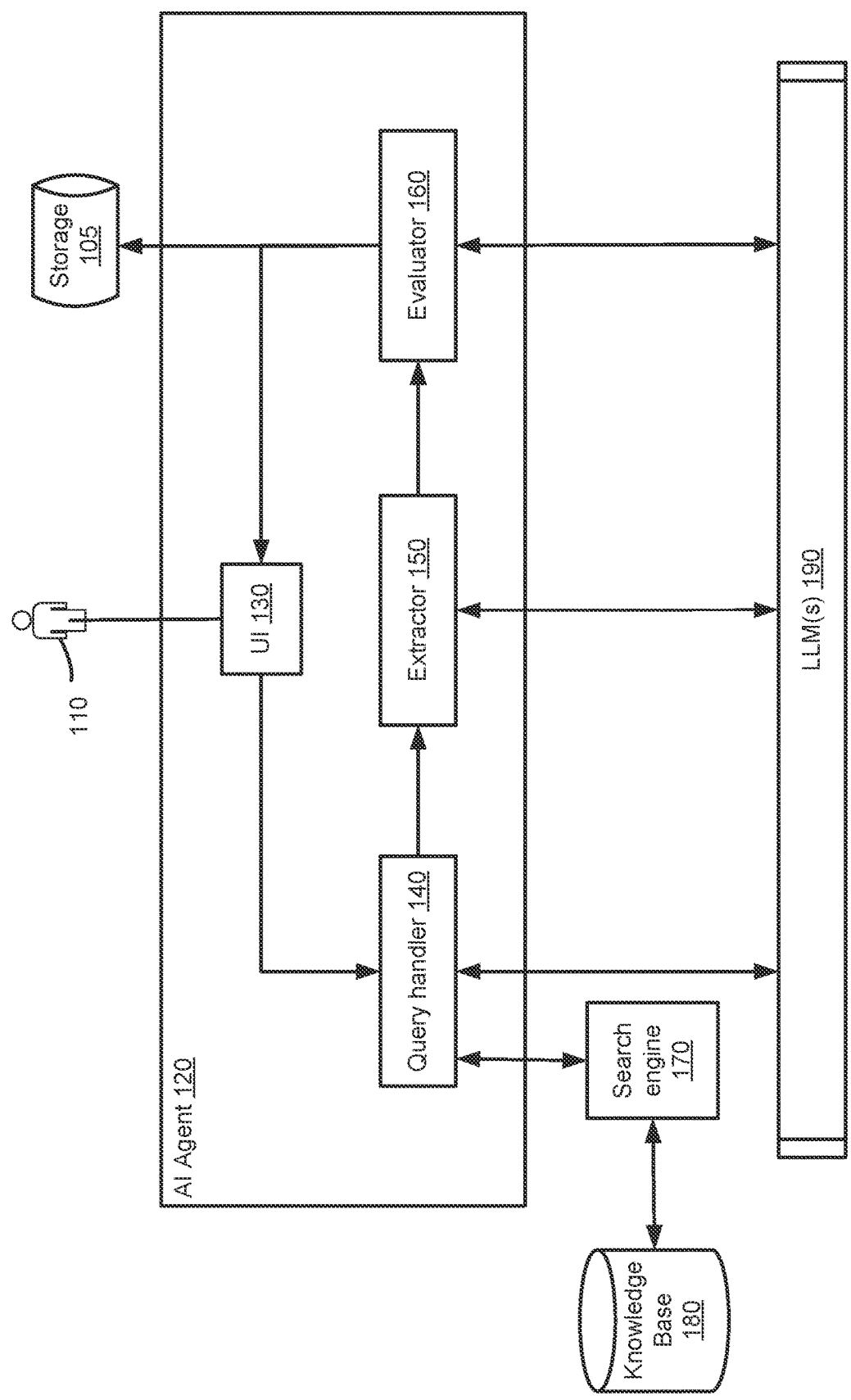
FIG. 1 is an overall block diagram of an example computing environment including an artificial intelligence (AI) agent for enhanced data search and evaluation.

Overview of Data Searching and Analysis in Business Intelligence

In an enterprise setting, it is often crucial for a business analyst or a representative to identify the prevailing trends or characteristics of a particular item or similar items in the market. This can be done either in the context of competitive analysis of products offered by the enterprise or to determine the potential value of an item.

One approach for data searching and analysis for business intelligence involves web crawling to identify similar items and then train a predictive model. However, this approach can run into legal issues with the websites that are being crawled, i.e., the crawled websites may demand that the crawling be stopped.

Besides legal hurdles, maintaining crawlers is also time-consuming and requires a lot of manual work. Web crawling is a complex process that involves navigating through vast amounts of data on the internet, downloading and storing such data, and then processing it for further use. The sheer volume of data on the internet means that crawlers need to be constantly running to keep up with updates and changes. Secondly, websites are not static entities: they evolve and change over time, which means that crawlers need to be regularly updated to adapt to these changes. This requires continuous monitoring and manual intervention, adding to the workload.

Another disadvantage of web crawling is that for any new domain of products, new crawlers need to be set up and a new predictive model needs to be trained. Setting up new crawlers for each product domain is necessary because different domains have different structures and data formats. A crawler designed for one domain may not work effectively for another. Thus, each new domain requires a custom crawler, which needs to be designed and tested, adding to the complexity of the process. Similarly, training a new predictive model for each domain is necessary because different domains may have different influencing factors and patterns. A model trained on one domain may not perform well on another due to these differences. Therefore, each new domain requires a custom predictive model that needs to be trained on relevant data, validated, and then deployed. This process is resource-intensive and requires significant computational power and time.

In summary, web crawling presents both legal and technical challenges when seeking business intelligence information.

The technologies described herein overcome many of the challenges described above. Specifically, disclosed herein is a technical solution using an artificial intelligent (AI) agent to perform real-time web searches for specific items of interest using existing search engines. The search results can be passed to a Large Language Model (LLM) to extract structured data, which can be further analyzed by the LLM to generate additional insights. As a result, the AI agent enhanced data search and analysis technologies described herein eliminate the need for pre-emptive data crawling, and can work across various domains with minimal changes, thus ensuring data freshness, and allowing for minimal storage of aggregate data based on actual business needs.

Example Computing System with AI Agent for Enhanced Data Search and Evaluation

FIG. 1 shows an overall block diagram of an example computing system 100 including an AI agent 120 supporting enhanced data search and evaluation. In some examples, the AI agent 120 can be implemented as a dedicated software, which can be an application programming interface (API) to a database system or a browser extension of a web browser.

AI Agent

As shown in FIG. 1, the AI agent 120 includes a user interface 130 (UI), a query handler 140, an extractor 150, and an evaluator 160. The AI agent 120 can communicate with a search engine 170, which is configured to search a knowledge base 180. In some examples, the search engine 170 can be a web-based search engine (e.g., Google, Microsoft Bing, etc.) and the knowledge base 180 can be the world wide web (or simply "web"). In some examples, the knowledge base 180 can be a custom or proprietary database, such as a relational database, a graph database, indices for Elasticsearch, etc.). The AI agent 120 can also communicate with one or more LLMs 190. In some examples, each of the query handler 140, extractor 150, and evaluator 160 can interact with a different LLM 190. In some examples, at least two (or all three) of the query handler 140, extractor 150, and evaluator 160 can communicate with the same LLM 190. Further details of the LLMs, including an example LLM architecture, are described more fully below.

Natural Language Query Input

Through the UI 130, a user 110 can enter a natural language query as a request for data search. As described herein, a natural language query is a user-generated text-based input that employs human language to request information or actions from a software or system. This contrasts with structured queries (e.g., structured query language (SQL) queries, SPARQL queries, Elasticsearch queries, etc.) used in software programs, which are special-purpose programming languages designed to manage data in a database.

Web-Based Search

Figure 7:
FIG. 7 depicts an example natural language query input by a user, structured data extracted from the search results of FIG. 6, and an output presented to the user.

The user-entered natural language query can be processed by the query handler 140. The query handler 140 can handle the user-entered natural language query differently based on what knowledge base 180 is used to perform the data search. If the knowledge base 180 is the web, then a web-based search engine 170 (e.g., Google, Bing, etc.) can be selected, and the user-entered natural language query can be directly submitted or passed to the search engine 170 to perform a web-based search (as the web-based search engine is generally capable of processing natural language queries). The web-based search results, such as the Search Engine Results Pages (SERPs), are typically unstructured, meaning that the data or content of the search results does not adhere to a specific, predefined format or schema. The web-based search results can be directly returned to the query handler 140. An example web-based search is described below in reference to FIGS. 6-7.

Query Transformation

On the other hand, if the knowledge base 180 is a custom database, then the user-entered natural language query must be first transformed, in runtime, to a structured query that is specific to the custom database, and that structured query is then submitted to a selected search engine 170 that is capable to search the custom database. In the following, two example types of structured query, namely SQL query and Elasticsearch query, are described. Nonetheless, it should be understood that other types of structured query (e.g., SPARQL queries, etc.) can also be transformed from the user-entered natural language query and used for data search.

In any of the examples described herein, "in runtime" refers to the period during which a software application is executing. It involves the software interacting with the runtime environment via a runtime system, which acts as an intermediary between the application and the operating system. Operations that are performed "in runtime" are automated and require no human interaction. The runtime environment handles computing tasks such as memory allocation and system resource access, enabling the software to operate efficiently and quickly (e.g., without a noticeable delay).

SQL Queries

In some examples, the knowledge base 180 can be a relational database, and the selected search engine 170 is configured to search one or more database tables within the relational database. In this scenario, the user-entered natural language query can be transformed into an SQL query. For example, the query handler 140 can implement such transformation by prompting, in runtime, an LLM 190 with a conversion prompt. The conversion prompt can define a structure of the one or more database tables and is configured to instruct the LLM 190 to generate the structured query in SQL.

After receiving the SQL query generated by the LLM 190, the query handler 140 can submit, in runtime, the SQL query to the selected search engine 170 for execution. The search results after running the SQL query are typically structured in a tabular format (e.g., each row in the table represents a record, and each column represents a field of the record). The search results returned by the search engine 170 are returned to the query handler 140.

Figure 8:
FIG. 8 depicts another example natural language query input by a user, structured data returned by searching a relational database, and an output presented to the user.

An example illustrating transformation of the user-entered natural language query to an SQL query and running the SQL query to search a relational database is described below in reference to FIG. 8.

Elasticsearch Queries

In some examples, the knowledge base 180 can be a database containing indices that can be searched by a document-oriented database, such as Elasticsearch (e.g., the search engine 170). Elasticsearch is a distributed search and analytics engine that uses a JSON-based query language to search for documents, filter data based on various criteria, perform full-text searches, and more. Elasticsearch queries are written in a structured format and can be customized to meet specific search and data retrieval needs. Specifically, Elasticsearch uses a data structure called an inverted index for fast full-text searches. An index in Elasticsearch is a collection of documents that have similar characteristics. Each document is a collection of fields, which are key-value pairs that contain relevant data. By default, Elasticsearch indexes all data in every field and each indexed field has a dedicated, optimized data structure. Elasticsearch can handle all types of data and various locations. The Elasticsearch engine ingests data from multiple locations, stores it, and indexes the data according to predefined mapping. As described herein, the user-entered natural language query can be transformed into an Elasticsearch query, which can be used to search one or more indices stored in the knowledge base 180. For example, the query handler 140 can achieve such transformation by prompting, in runtime, an LLM 190 with a conversion prompt. The conversion prompt can be configured to instruct the LLM 190 to generate the structured query in Elasticsearch query language.

After receiving the Elasticsearch query generated by the LLM 190, the query handler 140 can submit, in runtime, the Elasticsearch query to an Elasticsearch engine (e.g., the search engine 170) for execution. The Elasticsearch usually returns search results as JSON objects (e.g., each search hit in the response represents a document), which are typically not in a tabular format. The search results returned by the Elasticsearch engine are returned to the query handler 140.

An example illustrating transformation of the user-entered natural language query to an Elasticsearch query and running the Elasticsearch query to search an Elasticsearch database is described below in reference to FIGS. 10-11.

Extractor

The query handler 140 can pass the search results received from the search engine 170 to the extractor 150. If the received search results are already structured in a tabular format, then the extractor 150 can directly pass the search results to the evaluator 160. Otherwise, the extractor 150 is configured to extract, in runtime, structured data from the search results and pass the structured data to the evaluator 160. The extracted structured data can have a tabular format. For instance, extracted structured data can include a table including one or more records (e.g., in rows) and a plurality of fields (e.g., in columns).

In some examples, a web-based search engine can return unstructured SERPs, and the extractor 150 can extract a structured data table summarizing objects or entities identified from the unstructured SERPs. An example illustrating extraction of tabularized data from SERPs is described below in reference to FIGS. 6-7. In some examples, an Elasticsearch engine can return search results as JSON objects, and the extractor 150 can extract a structured data table based on the JSON objects. An example illustrating extraction of tabularized data from JSON objects is described below in reference to FIGS. 10-11.

In some examples, the extractor 150 is configured to extract tabularized data from the search results by submitting, in runtime, the search results to an LLM 190 and prompting, in runtime, the LLM 190 with an extraction prompt. The extraction prompt is configured to instruct the LLM 190 to extract the structured data (e.g., in tabular format) from the search results.

In some examples, the LLM used for extracting structured data and the LLM used for transforming the user-entered natural language query into a structured query can be the same. In some examples, the LLM used for extracting structured data can be different from the LLM used for transforming the user-entered natural language query into a structured query.

Batch-Mode Extraction

In some examples, the extractor 150 is configured to submit, in runtime, the complete set of search results to the LLM 190 all at once (i.e., in one batch). In some examples, the extractor 150 is configured to submit, in runtime, the search results to the LLM 190 in multiple batches, each batch comprising a subset of the search results. For instance, each batch can include a single entry (e.g., a single entry of web-based search results, a single JSON object, etc.) or multiple entries of the search results (e.g., one page of web-based search results, multiple JSON objects, etc.). The prompting is applied, in runtime, to each batch independently so that the LLM 190 generates multiple responses for the multiple batches, respectively (i.e., each batch generates a separate response). The extractor 150 can then synthesize, in runtime, the structured data from the multiple responses.

Synthesis of the structured data from the multiple responses can involve either concatenation or harmonization, depending on the structure of the structured data generated by the LLM 190 for different batches. For example, concatenation is applicable when the tables generated by the LLM 190 for different batches have identical fields or columns. In this scenario, the data from each batch can be directly appended to form a larger table.

Harmonization, however, can be used when the tables generated by the LLM 190 for different batches have varying fields or columns. This requires a transformation or mapping process to align the data from different batches into a common structure. In one example, the extractor 150 can be configured to generate a unified Table (e.g., union of all fields). For example, if Batch 1 generates a table with columns A, B, and C, and Batch 2 generates a table with columns A, D, and E, then a unified table would include all unique columns from both batches (A, B, C, D, E). This might involve filling in missing values for columns that do not appear in certain batches. In another example, the extractor 150 can be configured to create a table that only includes the common fields (e.g., intersection of fields) between all batches. For instance, if Batch 1 has columns A, B, and C and Batch 2 has columns A, B, and E, then the harmonized table would only include columns A and B, which are common to both batches.

When dealing with unstructured or non-tabularized search results, the mode of sending data to the LLM 190 can impact the quality of the output. Sending all search results to LLM 190 at once allows the LLM 190 to get a holistic view of the data and can help it understand the overall context better, thus potentially leading to more contextually relevant responses. Additionally, it can be more efficient to process all data at once, especially when dealing with smaller datasets. Sending all data at once can also simplify the process, as there's no need to manage batches or handle potential issues that can arise from batch processing, such as order dependence or batch inconsistency. Further, when all data is processed together, the responses of LLM 190 are based on the same set of information, thus may potentially result in more consistent outputs.

On the other hand, if the extractor 150 submits the entire set of search results to the LLM 190 at once, the LLM 190 is faced with the complex task of sifting through a large volume of unstructured data to extract structured or tabularized information. This can be challenging and may lead to less accurate or less relevant results in some circumstances. In addition, this could cause the LLM to reach its maximum input token limit and not be able to consider the entire data set. However, if the extractor 150 operates in a batch mode, sending one entry at a time or small batches of entries to the LLM 190, it allows for a more focused and manageable approach. This is because the LLM 190 can concentrate on a smaller subset of data at each step, reducing the complexity of the task and potentially improving the accuracy of the structured data extraction. Furthermore, this incremental approach allows the LLM 190 to generate responses using a chain of thoughts prompting, meaning it can build responses step by step, considering each piece of information in turn.

Evaluator

The evaluator 160 is configured to evaluate the structured data sent from the extractor 150. Specifically, when the received structured data has one or more records organized in a table format, the evaluator 160 is configured to generate scores for the one or more records. In some examples, the scores can provide a ranking of the one or more records. In some examples, the scores can be calculated based on numerical values of one or more selected attributes. For instance, various statistical measures such as the mean, median, maximum, minimum, standard deviation, lower/upper quartiles, or other metrics can be used to calculate the scores for a selected attribute across the records.

In some examples, the evaluator 160 can submit, in runtime, the structured data to a LLM 190. The evaluator 160 can also prompt, in runtime, the LLM 190 with an evaluation prompt. The evaluation prompt can be configured to instruct the LLM 190 to generate the scores for the records. For example, the evaluator 160 can instruct the LLM 190 how to generate the scores (e.g., ranking, calculating average, range, etc.).

In some examples, the LLM in communication with the evaluator 160 can be the same as LLM in communication with the extractor 150 (for extraction of structure data) and/or the LLM in communication with the query handler 140 (for transforming to a structured query). In some examples, the LLM in communication with the evaluator 160 can be different from the LLM in communication with the extractor 150 and/or the LLM in communication with the query handler 140.

Batch-Mode Evaluation

Just like the extractor 150, the evaluator 160 also has flexibility in how it submits structured data to the LLM 190. For example, the evaluator 160 can choose to submit, in runtime, all data to the LLM 190 at once or in batches. Submitting all data at once can be beneficial in terms of efficiency and consistency. It allows the LLM 190 to process all records simultaneously, which can lead to faster response times. Moreover, it ensures that the LLM's responses are based on a consistent set of data, leading to more uniform outputs.

On the other hand, submitting structured data in batches can enhance the accuracy of the LLM's responses, especially when calculation of the scores needs to consider the dependency between the records (e.g., ranking the records, etc.). This incremental approach aligns well with the natural process of the LLM, allowing it to fully utilize its chain of thoughts prompting capability, which is particularly effective when dealing with large or complex datasets, as it allows the LLM to focus on smaller, more manageable chunks of information at a time, thereby improving the precision and relevance of its responses.

Output and Storage

The output of the evaluator 160, including the structured data and the scores, can be presented on the UI 130. The structured data can be presented in a table format and the scores can be added as a new attribute (e.g., a new column) in the table. From the perspective of the user 110, the final search results (e.g., the structured data including the scores) are produced as if in direct response to the user provided natural language search input. All intermediate steps, including various interactions between the AI agent 120 and the LLM(s) 190 (e.g., transforming the user provided natural language search input to a structured query, extracting structured data from search results, evaluation of the structured data, etc.) are automatically performed and hidden from the user 130.

In some examples, the output of the evaluator 160 (e.g., the structured data and the scores) can be saved in a data storage 105 for later reference and analysis. In some examples, the data storage 105 can be optional.

System Variations and Implementation

In practice, the systems shown herein, such as the computing system 100, can vary in complexity, with additional functionality, more complex components, and the like. For example, there can be additional functionality within the AI agent 120. Additional components can be included to implement security, redundancy, load balancing, report design, data logging, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, queries, prompts, search results, structured data, and the like can be stored in one or more computer-readable storage media or computer-readable storage devices. The technologies described herein can be generic to the specifics of operating systems or hardware and can be applied in any variety of environments to take advantage of the described features.

Example Overview of LLMs and Prompts

Generative AI is a type of AI that can create content, such as text, images, or even code, and it is used in enterprise environments for tasks like automated content generation, data analysis, and chatbot interactions to enhance productivity and efficiency. In contrast to discriminative AI models which aim to make decisions or predictions based on features of the input data, generative AI models focus on generating new data points. The LLM is a type of generative AI that can understand and generate human-like text. In generative AI, such as LLMs, a prompt serves as an input or instruction that informs the AI of the desired content, context, or task, allowing users to guide the AI to produce tailored responses, explanations, or creative content based on the provided prompt.

In any of the examples herein, an LLM can take the form of an AI model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In any of the examples herein, prompts can be provided, in runtime, to LLMs to generate responses. Prompts in LLMs can be input instructions that guide model behavior. Prompts can be textual cues, questions, or statements that users provide to elicit desired responses from the LLMs. Prompts can act as primers for the model's generative process. Sources of prompts can include user-generated queries, predefined templates, or system-generated suggestions. Technically, prompts are tokenized and embedded into the model's input sequence, serving as conditioning signals for subsequent text generation. Experiment with prompt variations can be performed to manipulate output, using techniques like prefixing, temperature control, top-K sampling, chain-of-thought, etc. These prompts, sourced from diverse inputs and tailored strategies, enable users to influence LLM-generated content by shaping the underlying context and guiding the neural network's language generation. For example, prompts can include instructions and/or examples to encourage the LLMs to provide results in a desired style and/or format.

Example Architecture of LLM

Figure 2:
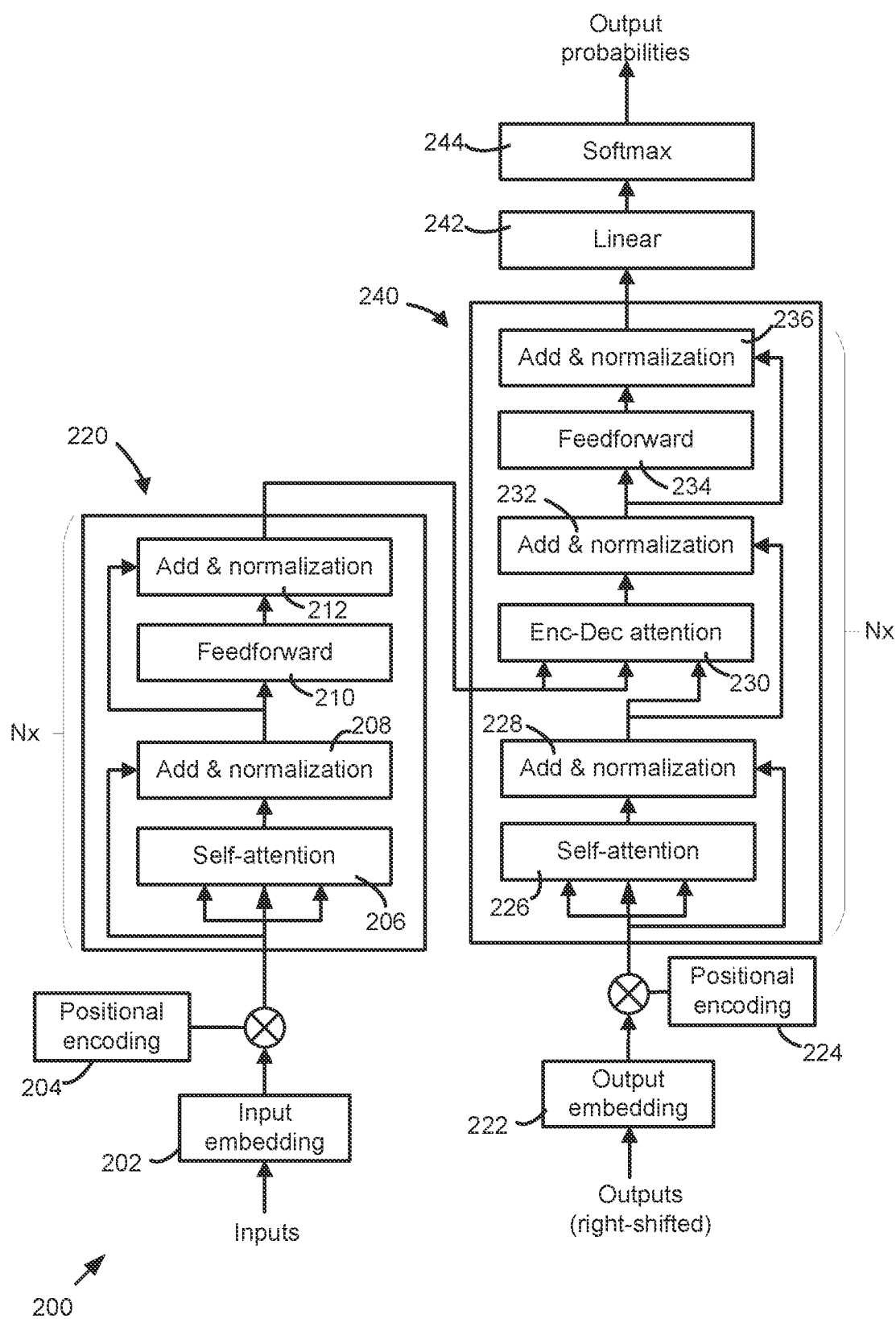
FIG. 2 is an architecture diagram of an example large language model.

FIG. 2 shows an example architecture of an LLM 200, which can be used as any of the LLM(s) 190 of FIG. 1.

In the depicted example, the LLM 200 uses an autoregressive model (as implemented in OpenAI's GPT) to generate text content by predicting the next word in a sequence given the previous words. The LLM 200 can be trained to maximize the likelihood of each word in the training dataset, given its context.

As shown in FIG. 2, the LLM 200 can have an encoder 220 and a decoder 240, the combination of which can be referred to as a "transformer." The encoder 220 processes input text, transforming it into a context-rich representation. The decoder 240 takes this representation and generates text output.

For autoregressive text generation, the LLM 200 generates text in order, and for each word it generates, it relies on the preceding words for context. During training, the target or output sequence, which the model is learning to generate, is presented to the decoder 240. However, the output is right shifted by one position compared to what the decoder 240 has generated so far. In other words, the model sees the context of the previous words and is tasked with predicting the next word. As a result, the LLM 200 can learn to generate text in a left-to-right manner, which is how language is typically constructed.

Text inputs to the encoder 220 can be preprocessed through an input embedding unit 202. Specifically, the input embedding unit 202 can tokenize a text input into a sequence of tokens, each of which represents a word or part of a word. Each token can then be mapped to a fixed-length vector known as an input embedding, which provides a continuous representation that captures the meaning and context of the text input. Likewise, to train the LLM 200, the targets or output sequences presented to the decoder 240 can be preprocessed through an output embedding unit 222. Like the input embedding unit 202, the output embedding unit 222 can provide a continuous representation, or output embedding, for each token in the output sequences.

Generally, the vocabulary in LLM 200 is fixed and is derived from the training data. The vocabulary in LLM 200 consists of tokens generated above during the training process. Words not in the vocabulary cannot be output. These tokens are strung together to form sentences in the text output.

In some examples, positional encodings (e.g., 204 and 224) can be performed to provide sequential order information of tokens generated by the input embedding unit 202 and output embedding unit 222, respectively. Positional encoding is needed because the transformer, unlike recurrent neural networks, process all tokens in parallel and do not inherently capture the order of tokens. Without positional encoding, the model would treat a sentence as a collection of words, losing the context provided by the order of words. Positional encoding can be performed by mapping each position/index in a sequence to a unique vector, which is then added to the corresponding vector of input embedding or output embedding. By adding positional encoding to the input embedding, the model can understand the relative positions of words in a sentence. Similarly, by adding positional encoding to the output encoding, the model can maintain the order of words when generating text output.

Each of the encoder 220 and decoder 240 can include multiple stacked or repeated layers (denoted by Nx in FIG. 2). The number of stacked layers in the encoder 220 and/or decoder 240 can vary depending on the specific LLM architecture. Generally, a higher "N" typically means a deeper model, which can capture more complex patterns and dependencies in the data but may require more computational resources for training and inference. In some examples, the number of stacked layers in the encoder 220 can be the same as the number of stacked layers in the decoder 240. In other examples, the LLM 200 can be configured so that the encoder 220 and decoder 240 can have different numbers of layers. For example, a deeper encoder (more layers) can be used to better capture the input text's complexities while a shallower decoder (fewer layers) can be used if the output generation task is less complex).

The encoder 220 and the decoder 240 are related through shared embeddings and attention mechanisms, which allow the decoder 240 to access the contextual information generated by the encoder 220, enabling the LLM 200 to generate coherent and contextually accurate responses. In other words, the output of the encoder 220 can serve as a foundation upon which the decoder network can build the generated text.

Both the encoder 220 and decoder 240 comprise multiple layers of attention and feedforward neural networks. An attention neural network can implement an "attention" mechanism by calculating the relevance or importance of different words or tokens within an input sequence to a given word or token in an output sequence, enabling the model to focus on contextually relevant information while generating text. In other words, the attention neural network plays "attention" on certain parts of a sentence that are most relevant to the task of generating text output. A feedforward neural network can process and transform the information captured by the attention mechanism, applying non-linear transformations to the contextual embeddings of tokens, enabling the model to learn complex relationships in the data and generate more contextually accurate and expressive text.

In the example depicted in FIG. 2, the encoder 220 includes an intra-attention or self-attention neural network 206 and a feedforward neural network 210, and the decoder 240 includes a self-attention neural network 226 and a feedforward neural network 234. The self-attention neural networks 206, 226 allow the LLM 200 to weigh the importance of different words or tokens within the same input sequence (self-attention in the encoder 220) and between the input and output sequences (self-attention in the decoder 240), respectively.

In addition, the decoder 240 also includes an inter-attention or encoder-decoder attention neural network 230, which receives input from the output of the encoder 220. The encoder-decoder attention neural network 230 allows the decoder 240 to focus on relevant parts of the input sequence (output of the encoder 220) while generating the output sequence. As described below, the output of the encoder 220 is a continuous representation or embedding of the input sequence. By feeding the output of the encoder 220 to the encoder-decoder attention neural network 230, the contextual information and relationships captured in the input sequence (by the encoder 220) can be carried to the decoder 240. Such connection enables the decoder 240 to access to the entire input sequence, rather than just the last hidden state. Because the decoder 240 can attend to all words in the input sequence, the input information can be aligned with the generation of output to improve contextual accuracy of the generated text output.

In some examples, one or more of the attention neural networks (e.g., 206, 226, 230) can be configured to implement a single head attention mechanism, by which the model can capture relationships between words in an input sequence by assigning attention weights to each word based on its relevance to a target word. The term "single head" indicates that there is only one set of attention weights or one mechanism for capturing relationships between words in the input sequence. In some examples, one or more of the attention neural networks (e.g., 206, 226, 230) can be configured to implement a multi-head attention mechanism, by which multiple sets of attention weights, or "heads," in parallel to capture different aspects of the input sequence. Each head learns distinct relationships and dependencies within the input sequence. These multiple attention heads can enhance the model's ability to attend to various features and patterns, enabling it to understand complex, multifaceted contexts, thereby leading to more accurate and contextually relevant text generation. The outputs from multiple heads can be concatenated or linearly combined to produce a final attention output.

As depicted in FIG. 2, both the encoder 220 and the decoder 240 can include one or more addition and normalization layers (e.g., the layers 208 and 212 in the encoder 220, the layers 228, 232, and 236 in the decoder 240). The addition layer, also known as a residual connection, can add the output of another layer (e.g., an attention neural network or a feedforward network) to its input. After the addition operation, a normalization operation can be performed by a corresponding normalization layer, which normalizes the features (e.g., making the features to have zero mean and unit variance), This can help in stabilizing the learning process and reducing training time.

A linear layer 242 at the output end of the decoder 240 can transform the output embeddings into the original input space. Specifically, the output embeddings produced by the decoder 240 are forwarded to the linear layer 242, which can transform the high-dimensional output embeddings into a space where each dimension corresponds to a word in the vocabulary of the LLM 200.

The output of the linear layer 242 can be fed to a softmax layer 244, which is configured to implement a softmax function, also known as softargmax or normalized exponential function, which is a generalization of the logistic function that compresses values into a given range. Specifically, the softmax layer 244 takes the output from the linear layer 242 (also known as logits) and transforms them into probabilities. These probabilities sum up to 1, and each probability corresponds to the likelihood of a particular word being the next word in the sequence. Typically, the word with the highest probability can be selected as the next word in the generated text output.

Still referring to FIG. 2, the general operation process for the LLM 200 to generate a reply or text output in response to a received prompt input is described below.

First, the input text is tokenized, e.g., by the input embedding unit 202, into a sequence of tokens, each representing a word or part of a word. Each token is then mapped to a fixed-length vector or input embedding. Then, positional encoding 204 is added to the input embeddings to retain information regarding the order of words in the input text.

Next, the input embeddings are processed by the self-attention neural network 206 of the encoder 220 to generate a set of hidden states. As described above, multi-head attention mechanism can be used to focus on different parts of the input sequence. The output from the self-attention neural network 206 is added to its input (residual connection) and then normalized at the addition and normalization layer 208.

Then, the feedforward neural network 210 is applied to each token independently. The feedforward neural network 210 includes fully connected layers with non-linear activation functions, allowing the model to capture complex interactions between tokens. The output from the feedforward neural network 210 is added its input (residual connection) and then normalized at the addition and normalization layer 212.

The decoder 240 uses the hidden states from the encoder 220 and its own previous output sequence to generate the next token in an autoregressive manner so that the sequential output is generated by attending to the previously generated tokens. Specifically, the output of the encoder 220 (input embeddings processed by the encoder 220) are fed to the encoder-decoder attention neural network 230 of the decoder 240, which allows the decoder 240 to attend to all words in the input sequence. As described above, the encoder-decoder attention neural network 230 can implement a multi-head attention mechanism, e.g., computing a weighted sum of all the encoded input vectors, with the most relevant vectors being attributed the highest weights.

The previous output sequence of the decoder 240 is first tokenized by the output embedding unit 222 to generate an output embedding for each token in the output sequence. Similarly, positional embedding 224 is added to the output embedding to retain information regarding the order of words in the output sequence.

The output embeddings are processed by the self-attention neural network 226 of the decoder 240 to generate a set of hidden states. The self-attention mechanism allows each token in the text output to attend to all tokens in the input sequence as well as all previous tokens in the output sequence. The output from the self-attention neural network 226 is added to its input (residual connection) and then normalized at the addition and normalization layer 228.

The encoder-decoder attention neural network 230 receives the output embeddings processed through the self-attention neural network 226 and the addition and normalization layer 228. Additionally, the encoder-decoder attention neural network 230 also receives the output from the addition and normalization layer 212 which represents input embeddings processed by the encoder 220. By considering both processed input embeddings and output embeddings, the output of the encoder-decoder attention neural network 230 represents an output embedding which takes into account both the input sequence and the previously generated outputs. As a result, the decoder 240 can generate the output sequence that is contextually aligned with the input sequence.

The output from the encoder-decoder attention neural network 230 is added to part of its input (residual connection), i.e., the output from the addition and normalization layer 228, and then normalized at the addition and normalization layer 232. The normalized output from the addition and normalization layer 232 is then passed through the feedforward neural network 234. The output of the feedforward neural network 234 is added to its input (residual connection) and then normalized at the addition and normalization layer 236.

The processed output embeddings output by the decoder 240 are passed through the linear layer 242, which maps the high-dimensional output embeddings back to the size of the vocabulary, that is, it transforms the output embeddings into a space where each dimension corresponds to a word in the vocabulary. The softmax layer 244 then converts output of the linear layer 242 into probabilities, each of which corresponds to the likelihood of a particular word being the next word in the sequence. Finally, the LLM 200 samples an output token from the probability distribution generated by the softmax layer 244 (e.g., selecting the token with the highest probability), and this token is added to the sequence of generated tokens for the text output.

The steps described above are repeated for each new token until an end-of-sequence token is generated or a maximum length is reached. Additionally, if the encoder 220 and/or decoder 240 have multiple stacked layers, the steps performed by the encoder 220 and decoder 240 are repeated across each layer in the encoder 220 and the decoder 240 for generation of each new token.

Example Overall Methods for AI-Powered Data Search and Evaluation

Figure 3:
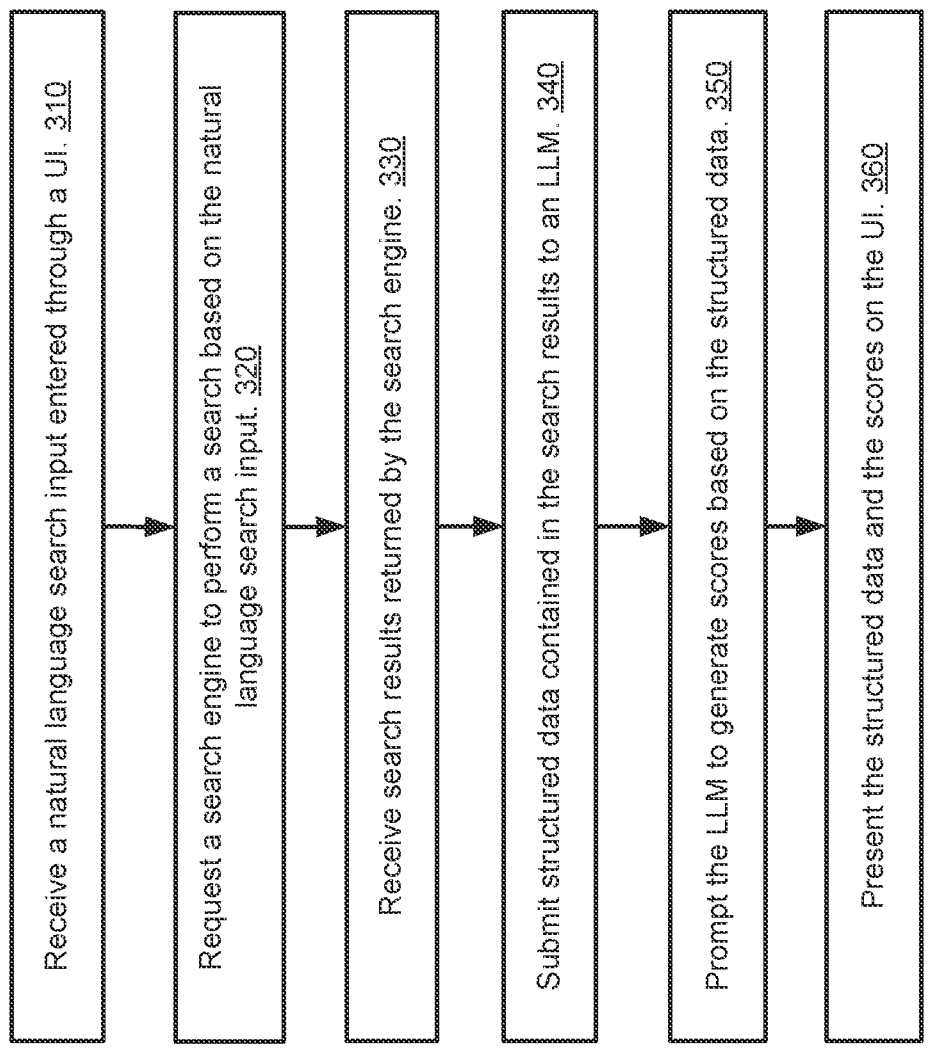
FIG. 3 is a flowchart illustrating an example overall method for implementing AI enhanced search and evaluation functionalities.

FIG. 3 is a flowchart illustrating an example overall method 300 for using an AI agent to perform enhanced data search and evaluation. The method 300 can be performed, e.g., by the AI agent 120 of FIG. 1.

At step 310, a natural language search input entered through a user interface (e.g., the UI 130) is received.

At step 320, a request can be made (e.g., by the query handler 140) to a search engine (e.g., the search engine 170) to perform a search based on the natural language search input. In some examples, the natural language search input can be first transformed, in runtime, to a structured query before sending the structured query to the search engine. As described above, transformation from the natural language search input to the structured query can be achieved, e.g., by prompting an LLM (e.g., the LLM 190).

At step 330, search results returned by the search engine are received (e.g., by the query handler 140). The search results can be structured (e.g., returned by a SQL search engine) or unstructured (e.g., returned by a web-based search engine).

At step 340, structured data contained in the search results can be submitted (e.g., by the evaluator 160), in runtime, to an LLM (e.g., the LLM 190). The structured data includes a table including one or more records and a plurality of fields. If the search results are already structured in a tabular format, then the search results can be directly submitted to the LLM. Otherwise, the structured data can be extracted (e.g., by the extractor 150), in runtime, from the search results and then submitted to the LLM. As described above, extraction of the structured data can be achieved by prompting, in runtime, an LLM (e.g., the LLM 190).

At step 350, the LLM can be prompted (e.g., by the evaluator 160), in runtime, to generate scores for the one or more records.

Then at step 360, the structured data and the scores can be presented on the user interface.

Figure 4:
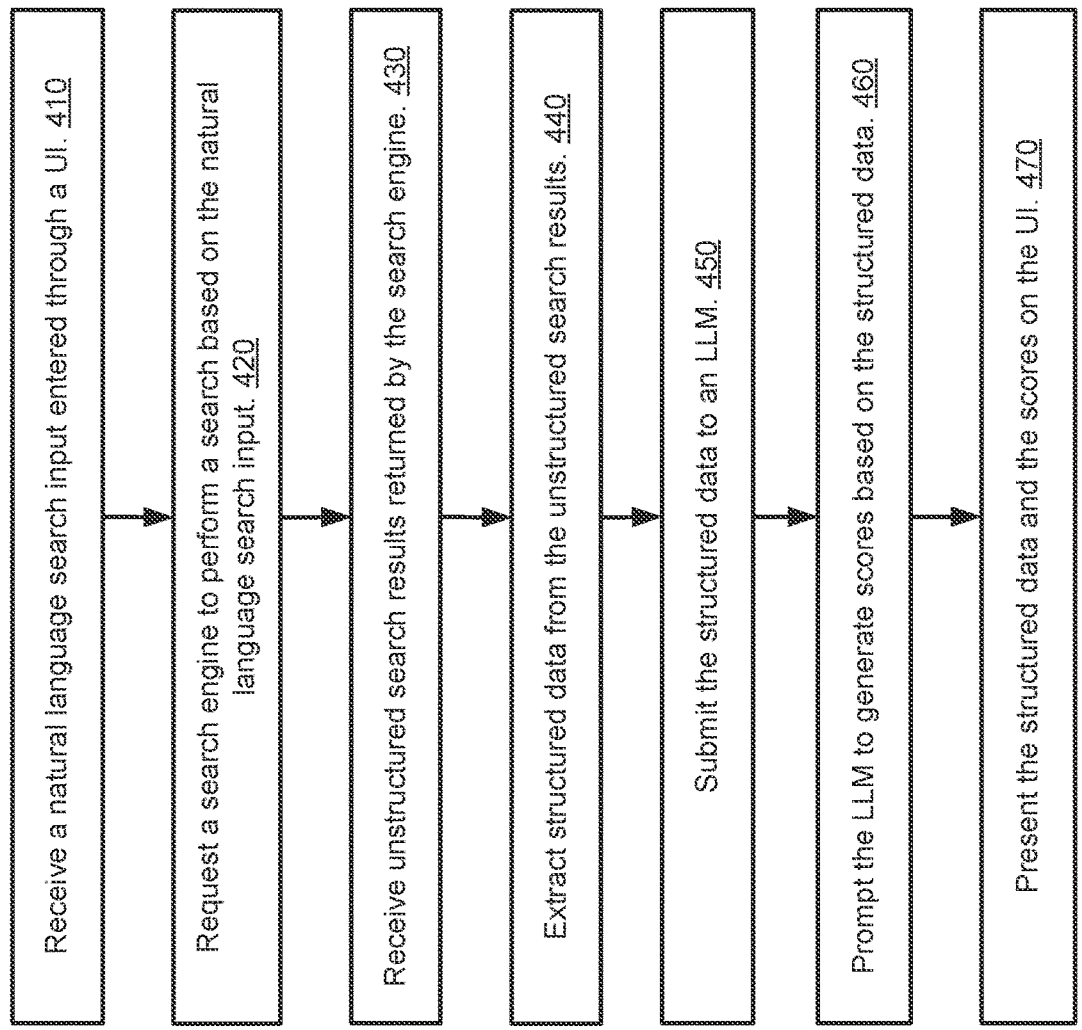
FIG. 4 is a flowchart illustrating another example method for implementing AI enhanced search and evaluation functionalities.

FIG. 4 is a flowchart illustrating another method 400 for AI-powered data search and evaluation, and can be performed, e.g., by the AI agent 120 of FIG. 1.

At step 410, a natural language search input entered through a user interface (e.g., the UI 130) is received.

At step 420, a request can be made (e.g., by the query handler 140) to a search engine (e.g., the search engine 170) to perform a search based on the natural language search input. In some examples, the natural language search input can be first transformed, in runtime, to a structured query before sending the structured query to the search engine. As described above, transformation from the natural language search input to the structured query can be achieved, e.g., by prompting an LLM (e.g., the LLM 190).

At step 430, unstructured search results returned by the search engine are received (e.g., by the query handler 140).

At step 440, structured data can be extracted (e.g., by the extractor 150), in runtime, from the unstructured search results. The structured data includes a table including one or more records and a plurality of fields. As described above, extraction of the structured data can be achieved by prompting, in runtime, an LLM (e.g., the LLM 190).

At step 450, the structured data can be submitted (e.g., by the evaluator 160), in runtime, to an LLM (e.g., the LLM 190).

At step 460, the LLM can be prompted (e.g., by the evaluator 160), in runtime, to generate scores for the one or more records.

Then at step 470, the structured data and the scores can be presented on the user interface.

Figure 5:
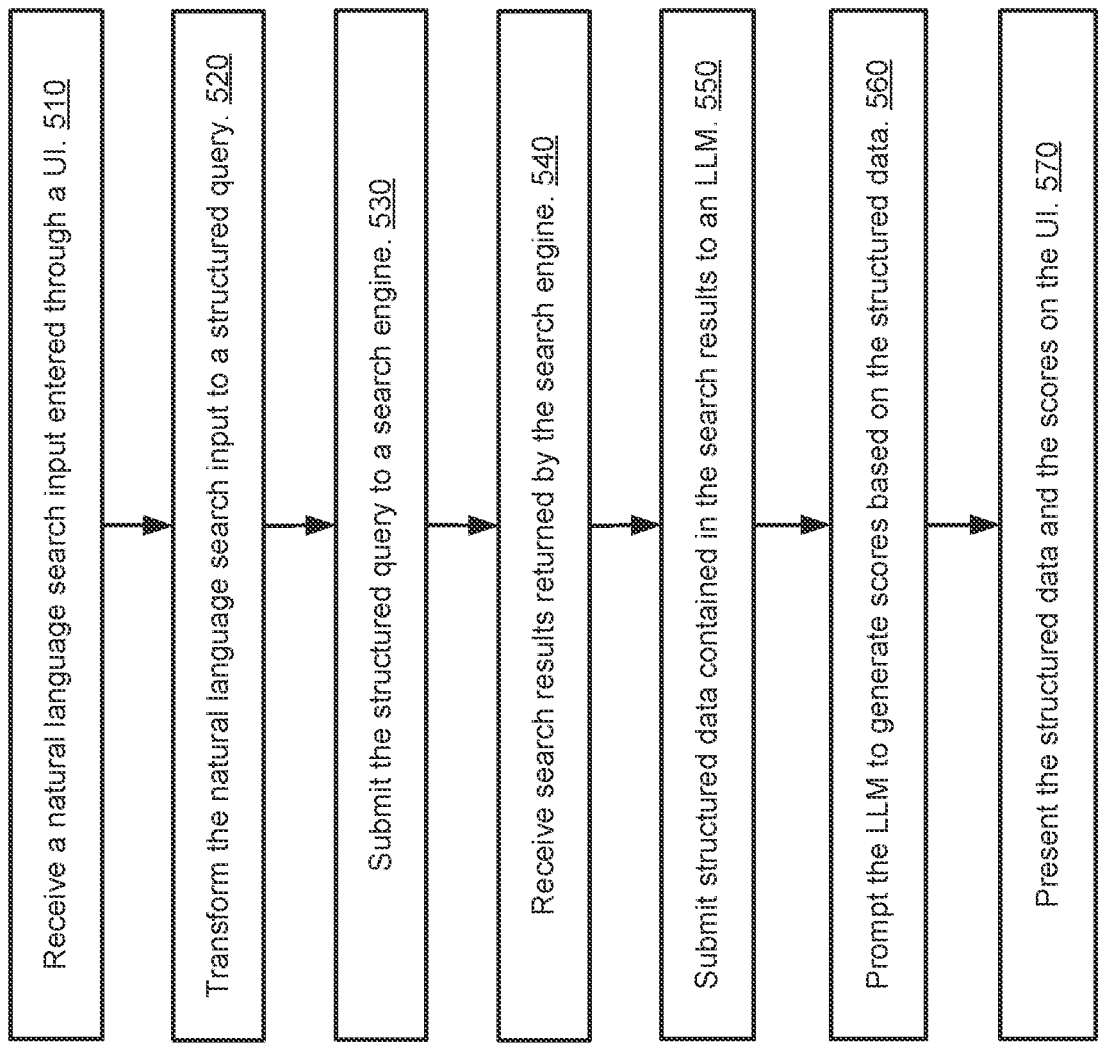
FIG. 5 is a flowchart illustrating yet another example method for implementing AI enhanced search and evaluation functionalities.

FIG. 5 is a flowchart illustrating yet another method 500 for AI-powered data search and evaluation, and can be performed, e.g., by the AI agent 120 of FIG. 1.

At step 510, a natural language search input entered through a user interface (e.g., the UI 130) is received.

At step 520, the natural language search input can be transformed (e.g., by the query handler 140), in runtime, to a structured query. As described above, transformation from the natural language search input to the structured query can be achieved, e.g., by prompting an LLM (e.g., the LLM 190).

At step 530, the structured query can be submitted (e.g., by the query handler 140), in runtime, to a search engine (e.g., the search engine 170), which can use the structured query to perform a search.

At step 540, search results returned by the search engine are received (e.g., by the query handler 140). The search results can be structured (e.g., returned by a SQL search engine) or unstructured (e.g., returned by a web-based search engine).

At step 550, structured data contained in the search results can be submitted (e.g., by the evaluator 160), in runtime, to an LLM (e.g., the LLM 190). The structured data includes a table including one or more records and a plurality of fields. If the search results are already structured in a tabular format, then the search results can be directly submitted to the LLM. Otherwise, the structured data can be extracted (e.g., by the extractor 150), in runtime, from the search results and then submitted to the LLM. As described above, extraction of the structured data can be achieved by prompting, in runtime, an LLM (e.g., the LLM 190).

At step 560, the LLM can be prompted (e.g., by the evaluator 160), in runtime, to generate scores for the one or more records.

Then at step 570, the structured data and the scores can be presented on the user interface.

The methods 300, 400, 500 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example Use Cases

FIGS. 6-10 depict several use cases to illustrate AI-powered data search and evaluation technologies describe herein.

In a first use case, a user enters a natural language search input 710 (FIG. 7) through a user interface. In this example, the user wants to perform a web-based search of "antique Victorian vase 1700s" with the goal of finding the best available deals. The user provided natural language search input 710 is directly submitted to a web-based search engine, which returns unstructured search results 600 in SERPs, a portion of which is shown in FIG. 6.

The unstructured search results 600 are submitted to an LLM as an input, together with an extraction prompt, e.g., "Extract structured data (in table format) from the given input." In response to the extraction prompt, the LLM generates structured data, which is a table 720 (FIG. 7) including three data records (arranged in rows), each of which has four attributes (arranged in columns).

Then, the table 720 is submitted to the LLM as an input, together with an evaluation prompt, e.g., "Rank the data below using the text as context. Return as a table, add ranking as a new column." In response to the evaluation prompt, the LLM generates a new table 730 (FIG. 7) which includes the original structured data and a new "Ranking" column. Without specific instructions, the ranking can be based on any one of (or a combination of) the attributes. In this example, the LLM ranks the records at least based on the "Price" attribute (from low to high). If other ranking criteria are desired, such ranking criteria can be added to the evaluation prompt to provide additional ranking instructions.

In some examples, the evaluation prompt can further include instructions to perform statistical calculations based on one or more attributes of the records. For example, the evaluation prompt can be "Rank the data below using the text as context. Return as a table, add ranking as a new column. If price (or other quantitative data) is available for the records, provide median value of the price (or other quantitative data)." Responsive to this evaluation prompt, besides generating the new table 730, the LLM can further output "Median price: $150.00" for the above example.

In a second use case, a user enters a natural language search input 810 (FIG. 8) through a user interface. In this example, the user wants to search a SQL database for "Green mustang Shelby 1967." The search the SQL database, the natural language search input 810 is first transformed to a SQL query. This can be implemented, for example, by providing the following conversion prompt:

```
TABLE cars, COLUMNS color VARCHAR(128),
make VARCHAR(128), model
VARCHAR(128), year INT, engine VARCHAR(128),
mileage INT, location
VARCHAR(128)
Turn this user query into a SQL query:
"Green mustang Shelby 1967"
```

The first line of the conversion prompt defines the structure of a database table named "cars." For example, it specifies the table's columns and their data types. This input outlines the schema for the database table that stores information about cars, with details such as color, make, model, year, engine type, mileage, and location. In some examples, based on what database is searched, the schema information of the database can be automatically retrieved (e.g., by the query handler 140). The second line of the conversion prompt specifically instruct the convert the natural language search input 810 to an SQL query.

Responding to the above conversion prompt, the LLM can generate the following SQL query:

```
SELECT*
FROM cars
WHERE color = 'Green'
AND model = 'Mustang Shelby'
AND year = 1967
```

This SQL query can then be sent to an SQL engine to search the "car" database table. In this example, the search results are returned as a structured table 820 (FIG. 8) including three records (arranged in rows) and five attributes (arranged in columns).

Then, the structured table 820 is submitted to the LLM as an input, together with an evaluation prompt, e.g., "Rank the data below using the text as context. Return as a table, add ranking as a new column." In response to the evaluation prompt, the LLM generates a new table 830 (FIG. 8) which includes the original structured data and a new "Ranking" column. Without specific instructions, the ranking can be based on any one of (or a combination of) the attributes. In this example, the LLM ranks the records at least based on the "Mileage" attribute (from low to high). If other ranking criteria are desired, such ranking criteria can be added to the evaluation prompt to provide additional ranking instructions.

In a third use case, a user enters a natural language search input 1010 (FIG. 10) through a user interface. In this example, the user wants to search an Elasticsearch database for "car restoration, wheel cap hub GT shelby." The search the Elasticsearch database, the natural language search input 1010 is first transformed to an Elasticsearch query. This can be implemented, for example, by providing the following conversion prompt:

```
Turn this user query into a to Elasticsearch query:
"car restoration, wheel cap hub GT shelby"
```

Responding to the above conversion prompt, the LLM can generate the following Elasticsearch query:

```
{
  "query": {
    "bool": {
      "must": [
        { "match": { "content": "car restoration" } },
        { "match": { "content": "wheel cap hub" } },
        { "match": { "content": "GT shelby" } }
      ]
    }
  }
}
```

Figure 9:
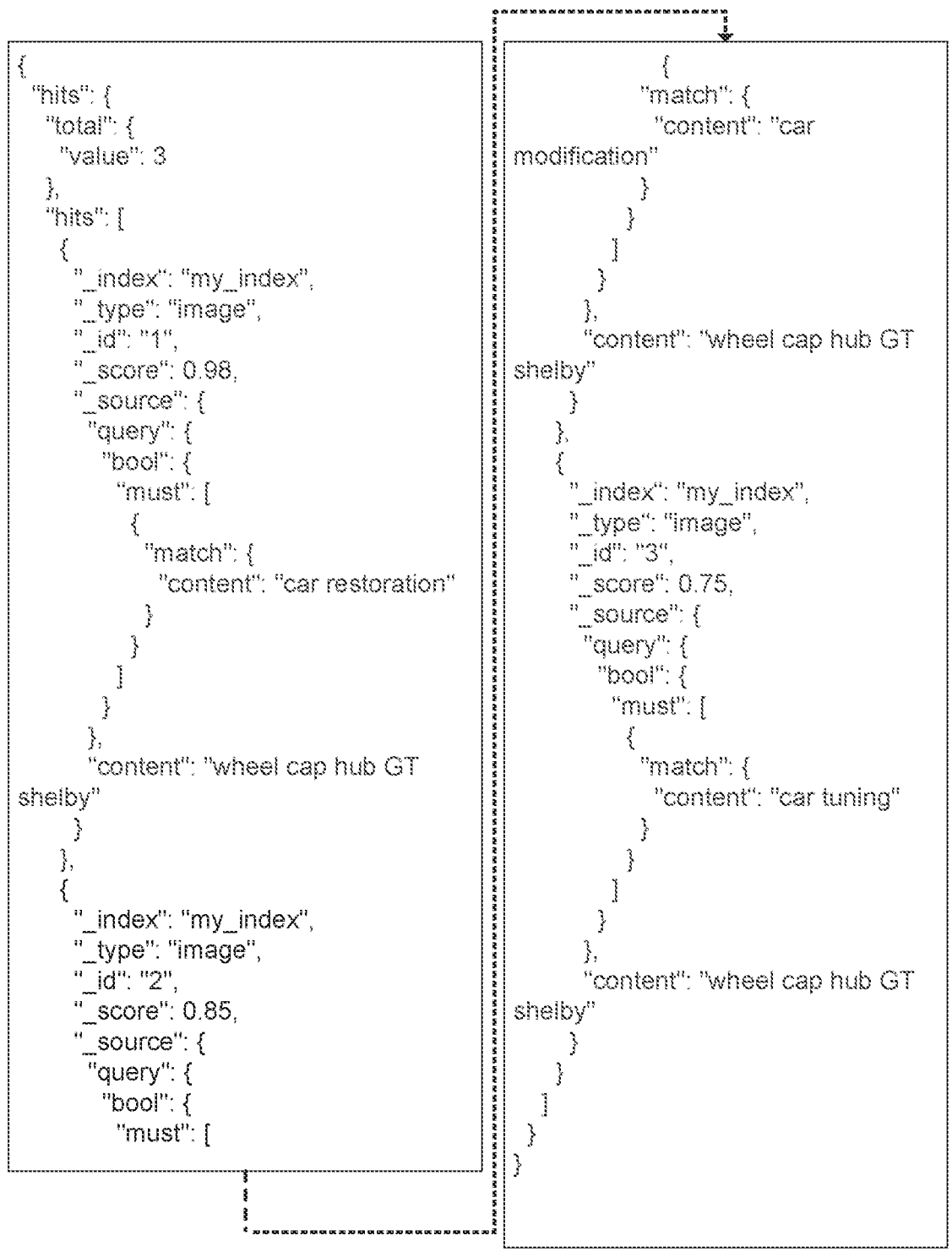
FIG. 9 depicts an example Elasticsearch query returned by an LLM.

This SQL query can then be sent to an Elasticsearch engine to perform the search. In this example, the search results are returned as JSON objects 900 (FIG. 9).

The JSON objects 900 are submitted to the LLM as an input, together with an extraction prompt, e.g., "Extract structured data (in table format) from the given input." In response to the extraction prompt, the LLM generates structured data, which is a table 1020 (FIG. 10) including three data records (arranged in rows) and seven attributes (arranged in columns).

Then, the table 1020 is submitted to the LLM as an input, together with an evaluation prompt, e.g., "Rank the data below using the text as context. Return as a table, add ranking as a new column." In response to the evaluation prompt, the LLM generates a new table 1030 (FIG. 10) which includes the original structured data and a new "Ranking" column. Without specific instructions, the ranking can be based on any one of (or a combination of) the attributes. In this example, the LLM ranks the records at least based on the "Score" attribute (from high to low). If other ranking criteria are desired, such ranking criteria can be added to the evaluation prompt to provide additional ranking instructions.

Example Advantages

A number of advantages can be achieved via the technologies described herein.

As described above, traditional methods of data search for competitive intelligence analysis often require the setup of large-scale crawlers. These crawlers are not only time-consuming to establish but also expensive to operate. Each new product domain necessitates the collection of a new dataset, and predictive models must be continually updated to reflect changing data. Furthermore, legal issues can arise from crawling sites that disallow such activities or from storing detailed data from crawled sites.

The technologies described herein address these challenges by employing an AI agent to perform real-time web searches for specific items of interest using existing search engines. When the search is based on a custom knowledge base, the user's natural language search input can be automatically transformed into a structured query capable of searching the knowledge base. This transformation can be facilitated by prompting an LLM.

The search results are then passed to an LLM, which extracts structured data containing key information. This extracted data can be organized into a table comprising records and attributes. The table can be further processed by the LLM to rank and/or perform statistical calculations based on the attributes of the records. The table and evaluation results can be presented to the user for further investigation. Aggregate search and evaluation results can be stored for future reference and analysis.

Thus, the technologies presented herein offer a transformative approach to data search and analysis. They eliminate the need for preemptive data crawling, thereby reducing setup time and operational costs. They are capable of working across various domains with minimal modifications, providing a versatile solution for diverse data landscapes. These technologies ensure data freshness by performing real-time searches, and they allow for minimal storage of aggregate data, aligning with actual business needs and optimizing resource usage.

The AI agent disclosed herein brings significant technical advantages in the technical field of competitive analysis. The AI agent provides real-time search capabilities that are agnostic to the domain, enhancing its applicability across different fields. The AI agent has the ability to transform unstructured natural language queries into structured ones, making it flexible to use different search engines to search custom knowledge base. The AI agent can extract, organize, and evaluate key information from search results, turning raw data into actionable insights. Moreover, The AI agent can store aggregate results for future use, facilitating ongoing analysis and decision-making processes. All these features culminate in a more efficient, flexible, and user-friendly data search experience.

Example Computing Systems

Figure 11:
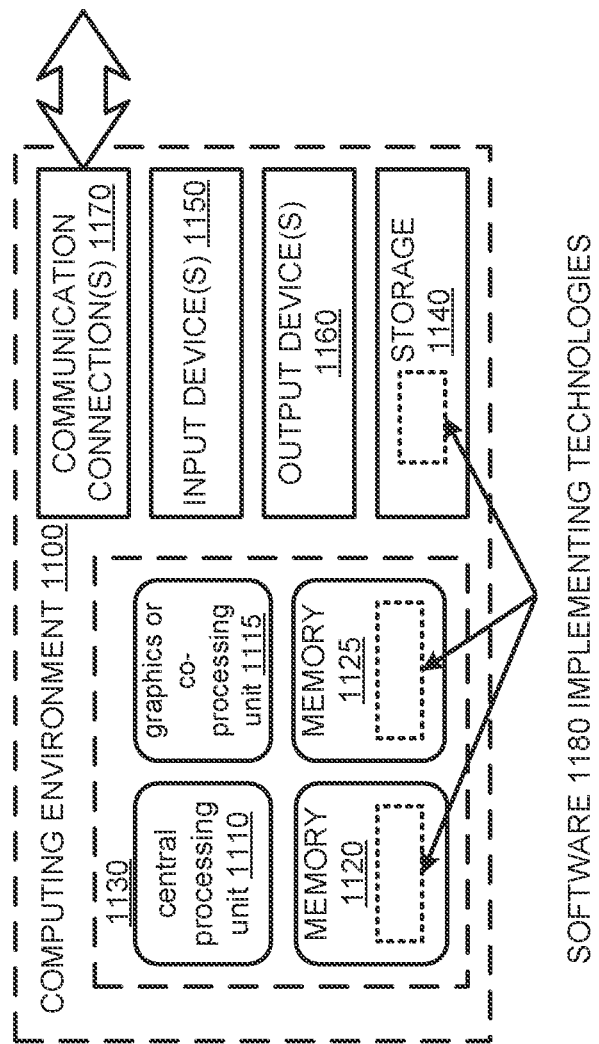
FIG. 11 is a block diagram of an example computing system in which described embodiments can be implemented.

FIG. 11 depicts an example of a suitable computing system 1100 in which the described innovations can be implemented. The computing system 1100 is not intended to suggest any limitation as to scope of use or functionality of the present disclosure, as the innovations can be implemented in diverse computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 can execute computer-executable instructions, such as for implementing the features described in the examples herein (e.g., the methods 300, 400, and 500). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 11 shows a central processing unit 1110 as well as a graphics processing unit or co-processing unit 1115. The tangible memory 1120, 1125 can be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 can store software 1180 implementing one or more innovations described herein, in the form of computer-executable instructions suitable for execution by the processing unit(s) 1110, 1115.

A computing system 1100 can have additional features. For example, the computing system 1100 can include storage 1140, one or more input devices 1150, one or more output devices 1160, and one or more communication connections 1170, including input devices, output devices, and communication connections for interacting with a user. An interconnection mechanism (not shown) such as a bus, controller, or network can interconnect the components of the computing system 1100. Typically, operating system software (not shown) can provide an operating environment for other software executing in the computing system 1100, and coordinate activities of the components of the computing system 1100.

The tangible storage 1140 can be removable or non-removable, and includes magnetic disks, magnetic tapes or cassettes, CD-ROMs, DVDs, or any other medium which can be used to store information in a non-transitory way and which can be accessed within the computing system 1100. The storage 1140 can store instructions for the software implementing one or more innovations described herein.

The input device(s) 1150 can be an input device such as a keyboard, mouse, pen, or trackball, a voice input device, a scanning device, touch device (e.g., touchpad, display, or the like) or another device that provides input to the computing system 1100. The output device(s) 1160 can be a display, printer, speaker, CD-writer, or another device that provides output from the computing system 1100.

The communication connection(s) 1170 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 12:
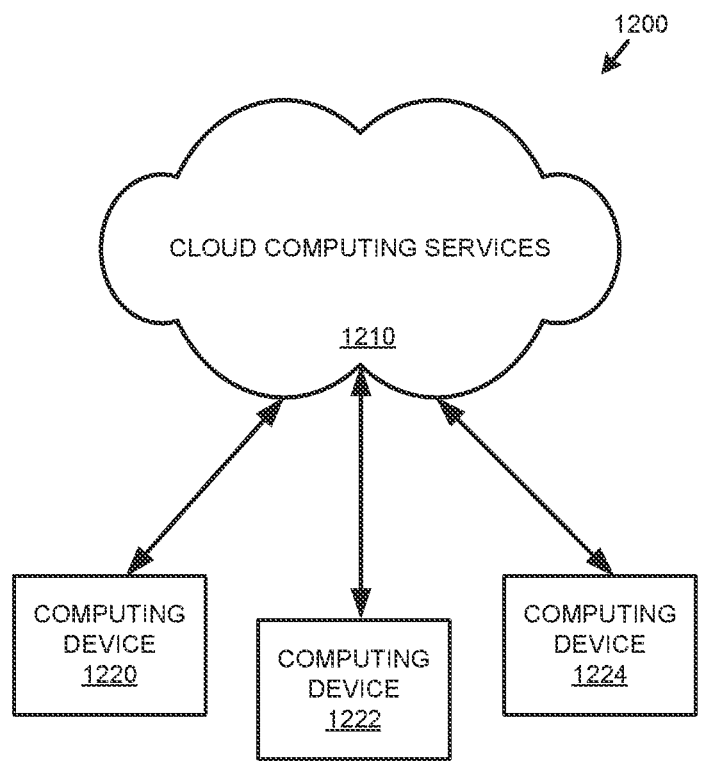
FIG. 12 is a block diagram of an example cloud computing environment that can be used in conjunction with the technologies described herein.

FIG. 12 depicts an example cloud computing environment 1200 in which the described technologies can be implemented, including, e.g., the system 100 and other systems herein. The cloud computing environment 1200 can include cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 can be utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

In practice, cloud-based, on-premises-based, or hybrid scenarios can be supported.

Example Implementations

In any of the examples herein, a software application (or "application") can take the form of a single application or a suite of a plurality of applications, whether offered as a service (SaaS), in the cloud, on premises, on a desktop, mobile device, wearable, or the like.

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

In any of the examples described herein, an operation performed in runtime means that the operation can be completed in real time or with negligible processing latency (e.g., the operation can be completed within 1 second, etc.).

Example Clauses

Any of the following example clauses can be implemented.

Clause 1. A computing system comprising: memory; one or more hardware processors coupled to the memory; and one or more computer readable storage media storing instructions that, when loaded into the memory, cause the one or more hardware processors to perform operations comprising: receiving a natural language search input entered through a user interface; requesting a search engine to perform a search based on the natural language search input; receiving search results returned by the search engine; submitting, in runtime, structured data contained in the search results to a first large language model, wherein the structured data comprises a table including one or more records and a plurality of fields; prompting, in runtime, the first large language model to generate scores for the one or more records; and presenting the structured data and the scores on the user interface.

Clause 2. The computing system of clause 1, wherein the natural language search input is directly submitted to the search engine, which is configured to perform a web-based search using the natural language search input.

Clause 3. The computing system of clause 2, wherein the operations further comprise transforming, in runtime, the natural language search input to a structured query and submitting the structured query to the search engine, wherein the structured query is used by the search engine to perform the search.

Clause 4. The computing system of clause 3, wherein the search engine is configured to search one or more database tables using the structured query, wherein transforming the natural language search input to the structured query comprises prompting, in runtime, a second large language model with a conversion prompt, wherein the conversion prompt defines a structure of the one or more database tables and is configured to instruct the second large language model to generate the structured query in structured query language.

Clause 5. The computing system of clause 4, wherein the second large language model is the same as the first large language model.

Clause 6. The computing system of clause 3, wherein the search engine is configured to perform an Elasticsearch of one or more indices, wherein transforming the natural language search input to the structured query comprises prompting, in runtime, a second large language model with a conversion prompt, wherein the conversion prompt is configured to instruct the second large language model to generate the structured query in Elasticsearch query language.

Clause 7. The computing system of clause 6, wherein the second large language model is the same as the first large language model.

Clause 8. The computing system of any one of clauses 1-7, wherein the search results are unstructured, wherein the operations further comprise extracting, in runtime, the structured data from the search results.

Clause 9. The computing system of clause 8, wherein the extracting comprises submitting, in runtime, the search results to a third large language model and prompting, in runtime, the third large language model with an extraction prompt, wherein the extraction prompt is configured to instruct the third large language model to extract the structured data from the search results.

Clause 10. The computing system of clause 9, wherein the search results are submitted to the third large language model in multiple batches, each batch comprising a subset of the search results, wherein the prompting is applied to each batch independently so that the third large language model generates multiple responses for the multiple batches, respectively, wherein the structured data is synthesized from the multiple responses.

Clause 11. A computer-implemented method comprising: receiving a natural language search input entered through a user interface; requesting a search engine to perform a search based on the natural language search input; receiving unstructured search results returned by the search engine; extracting, in runtime, structured data from the unstructured search results, wherein the structured data comprises a table including one or more records and a plurality of fields; submitting, in runtime, the structured data to a large language model; prompting, in runtime, a large language model to generate scores for the one or more records; and presenting the structured data and the scores on the user interface.

Clause 12. The computer-implemented method of clause 11, wherein the extracting comprises submitting, in runtime, the unstructured search results to the large language model and prompting, in runtime, the large language model with an extraction prompt, wherein the extraction prompt is configured to instruct the large language model to extract the structured data from the search results.

Clause 13. The computer-implemented method of any one of clauses 11-12, wherein the natural language search input is directly submitted to the search engine, which is configured to perform a web-based search using the natural language search input.

Clause 14. The computer-implemented method of clause 13, wherein the operations further comprise transforming, in runtime, the natural language search input to a structured query and submitting, in runtime, the structured query to the search engine, wherein the structured query is used by the search engine to perform the search.

Clause 15. The computer-implemented method of clause 14, wherein the search engine is configured to perform an Elasticsearch of one or more indices, wherein transforming the natural language search input to the structured query comprises prompting, in runtime, the large language model with a conversion prompt, wherein the conversion prompt is configured to instruct the large language model to generate the structured query in Elasticsearch query language.

Clause 16. One or more non-transitory computer-readable media having encoded thereon computer-executable instructions causing one or more processors to perform a method, the method comprising: receiving a natural language search input entered through a user interface; transforming, in runtime, the natural language search input to a structured query; submitting, in runtime, the structured query to a search engine, wherein the structured query is used by the search engine to perform a search; receiving search results returned by the search engine; submitting, in runtime, structured data contained in the search results to a large language model, wherein the structured data comprises a table including one or more records and a plurality of fields; prompting, in runtime, the large language model to generate scores for the one or more records; and presenting the structured data and the scores on the user interface.

Clause 17. The one or more non-transitory computer-readable media of clause 16, wherein the search engine is configured to search one or more database tables using the structured query, wherein transforming the natural language search input to the structured query comprises prompting, in runtime, the large language model with a conversion prompt, wherein the conversion prompt defines a structure of the one or more database tables and is configured to instruct the large language model to generate the structured query in structured query language.

Clause 18. The one or more non-transitory computer-readable media of clause 16, wherein the search engine is configured to perform an Elasticsearch of one or more indices, wherein transforming the natural language search input to the structured query comprises prompting, in runtime, the large language model with a conversion prompt, wherein the conversion prompt is configured to instruct the large language model to generate the structured query in Elasticsearch query language.

Clause 19. The one or more non-transitory computer-readable media of any one of clauses 16-18, wherein the search results are unstructured, wherein the operations further comprise extracting, in runtime, the structured data from the search results.

Clause 20. The one or more non-transitory computer-readable media of clause 19, wherein the extracting comprises submitting, in runtime, the search results to the large language model and prompting, in runtime, the large language model with an extraction prompt, wherein the extraction prompt is configured to instruct the large language model to extract the structured data from the search results.

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
 memory;
 one or more hardware processors coupled to the memory; and
 one or more computer readable storage media storing instructions that, when loaded into the memory, cause the one or more hardware processors to perform operations comprising:

receiving a natural language search input entered through a user interface;

requesting a search engine to perform a search based on the natural language search input;

receiving search results returned by the search engine;

submitting, in runtime, structured data contained in the search results to a first large language model, wherein the structured data comprises a table including one or more records and a plurality of fields;

prompting, in runtime, the first large language model to generate scores for the one or more records; and presenting the structured data and the scores on the user interface.

2. The computing system of claim 1, wherein the natural language search input is directly submitted to the search engine, which is configured to perform a web-based search using the natural language search input.

3. The computing system of claim 2, wherein the operations further comprise transforming, in runtime, the natural language search input to a structured query and submitting the structured query to the search engine, wherein the structured query is used by the search engine to perform the search.

4. The computing system of claim 3, wherein the search engine is configured to search one or more database tables using the structured query, wherein transforming the natural language search input to the structured query comprises prompting, in runtime, a second large language model with a conversion prompt, wherein the conversion prompt defines a structure of the one or more database tables and is configured to instruct the second large language model to generate the structured query in structured query language.

5. The computing system of claim 4, wherein the second large language model is the same as the first large language model.

6. The computing system of claim 3, wherein the search engine is configured to perform an Elasticsearch of one or more indices, wherein transforming the natural language search input to the structured query comprises prompting, in runtime, a second large language model with a conversion prompt, wherein the conversion prompt is configured to instruct the second large language model to generate the structured query in Elasticsearch query language.

7. The computing system of claim 6, wherein the second large language model is the same as the first large language model.

8. The computing system of claim 1, wherein the search results are unstructured, wherein the operations further comprise extracting, in runtime, the structured data from the search results.

9. The computing system of claim 8, wherein the extracting comprises submitting, in runtime, the search results to a third large language model and prompting, in runtime, the third large language model with an extraction prompt, wherein the extraction prompt is configured to instruct the third large language model to extract the structured data from the search results.

10. The computing system of claim 9, wherein the search results are submitted to the third large language model in multiple batches, each batch comprising a subset of the search results, wherein the prompting is applied to each batch independently so that the third large language model generates multiple responses for the multiple batches, respectively, wherein the structured data is synthesized from the multiple responses.

11. A computer-implemented method comprising:

receiving a natural language search input entered through a user interface;

requesting a search engine to perform a search based on the natural language search input;

receiving unstructured search results returned by the search engine;

extracting, in runtime, structured data from the unstructured search results, wherein the structured data comprises a table including one or more records and a plurality of fields;

submitting, in runtime, the structured data to a large language model;

prompting, in runtime, a large language model to generate scores for the one or more records; and presenting the structured data and the scores on the user interface.

12. The computer-implemented method of claim 11, wherein the extracting comprises submitting, in runtime, the unstructured search results to the large language model and prompting, in runtime, the large language model with an extraction prompt, wherein the extraction prompt is configured to instruct the large language model to extract the structured data from the search results.

13. The computer-implemented method of claim 11, wherein the natural language search input is directly submitted to the search engine, which is configured to perform a web-based search using the natural language search input.

14. The computer-implemented method of claim 13, wherein the operations further comprise transforming, in runtime, the natural language search input to a structured query and submitting, in runtime, the structured query to the search engine, wherein the structured query is used by the search engine to perform the search.

15. The computer-implemented method of claim 14, wherein the search engine is configured to perform an Elasticsearch of one or more indices, wherein transforming the natural language search input to the structured query comprises prompting, in runtime, the large language model with a conversion prompt, wherein the conversion prompt is configured to instruct the large language model to generate the structured query in Elasticsearch query language.

16. One or more non-transitory computer-readable media having encoded thereon computer-executable instructions causing one or more processors to perform a method, the method comprising:

receiving a natural language search input entered through a user interface;

transforming, in runtime, the natural language search input to a structured query;

submitting, in runtime, the structured query to a search engine, wherein the structured query is used by the search engine to perform a search;

receiving search results returned by the search engine;

submitting, in runtime, structured data contained in the search results to a large language model, wherein the structured data comprises a table including one or more records and a plurality of fields;

prompting, in runtime, the large language model to generate scores for the one or more records; and presenting the structured data and the scores on the user interface.

17. The one or more non-transitory computer-readable media of claim 16, wherein the search engine is configured to search one or more database tables using the structured query, wherein transforming the natural language search input to the structured query comprises prompting, in runtime, the large language model with a conversion prompt, wherein the conversion prompt defines a structure of the one or more database tables and is configured to instruct the large language model to generate the structured query in structured query language.

18. The one or more non-transitory computer-readable media of claim 16, wherein the search engine is configured to perform an Elasticsearch of one or more indices, wherein transforming the natural language search input to the structured query comprises prompting, in runtime, the large language model with a conversion prompt, wherein the conversion prompt is configured to instruct the large language model to generate the structured query in Elasticsearch query language.

19. The one or more non-transitory computer-readable media of claim 16, wherein the search results are unstructured, wherein the operations further comprise extracting, in runtime, the structured data from the search results.

20. The one or more non-transitory computer-readable media of claim 19, wherein the extracting comprises submitting, in runtime, the search results to the large language model and prompting, in runtime, the large language model with an extraction prompt, wherein the extraction prompt is configured to instruct the large language model to extract the structured data from the search results.

* * * * *